3,424,744
CELLULOSE ALKOXYL ETHER PRODUCT AND THE AQUEOUS DISPERSIONS THEREOF

Reid L. Mitchell and Charles F. Murphy, Morristown, and John C. Gwynn, Morris Plains, N.J., assignors to ITT Rayonier Incorporated, a corporation of Delaware
Continuation of application Ser. No. 260,952, Feb. 21, 1963. This application July 3, 1967, Ser. No. 651,055
U.S. Cl. 260—231
Int. Cl. C08b 29/34, 29/26
2 Claims

ABSTRACT OF THE DISCLOSURE

Finely divided string-like fibrous cellulose alkoxy ethers are prepared by controlled high-shear, mechanical dispersion of an aqueous slurry of hydroxyethyl cellulose or hydroxypropyl cellulose having from about 3 to 12% alkoxy substitution and a degree of polymerization of from about 50 to 400 at a temperature not exceeding 95° C. The finely divided string-like products so produced form stable gel-like dispersions when present in an aqueous solution in concentrations of from about 3 to 25% by weight.

---

This application is a continuation of Ser. No. 260,952 filed on Feb. 21, 1963 and now abandoned.

This invention relates to fibrous cellulose alkoxyl ether and provides a process for subdividing the fibers to form an improved product consisting of dispersed fibrillar particles in an aqueous system. The invention is concerned with the subdivision of fibrous cellulose ethoxyl and propoxyl ethers of the type which are alkali soluble but water insoluble. For convenience these ethers will also be referred to as cellulosic ether.

This invention is based upon the discovery that the fibers of a particular hydroxyethylcellulose can be subdivided mechanically in an aqueous system into fibrillar particles to form a smooth, creamy, gel-like dispersion which has surprising stability, and utility not found in the original fibrous material. In accordance with the invention, the cellulosic ether fibers having from about 3 to 12%, preferably from 8 to 10%, of alkoxyl substitution, ethylene oxide or propylene oxide, and a degree of polymerization (D.P.) of from 50 to 400, preferably about 200, are dispersed mechanically in an aqueous system to form a gel-like dispersion. In a preferred process an aqueous slurry of the fibrous cellulose ether is subjected to mechanical fibrillation or subdivision preferably in a high-shear type mixing device under suitable temperature control to prevent overheating. The aqueous system may be ordinary water but the efficiency of the process and the characteristics of the product can be improved by using in the aqueous system a swelling agent such as ammonia. The aqueous system may contain up to about 28% of ammonia preferably about 15 to 20% of ammonia.

The invention is advantageously applicable to the conversion of certain cellulosic ether fibers produced from wood pulp which fibers have been subjected to suitably controlled degrees of substitution (D.S.) and degrees of polymerization (D.P.). Such substituted fibers have many of the physical characteristics of the original pulp fibers. The invention will be described generally with reference to and as it is applied particularly to the treatment of hydroxyethylcellulose (HEC) fibers. The HEC fibers having the properties aforementioned in the form of a slurry having a consistency of about 10% solids content are mechanically subdivided in a high-speed shear mill such as an Oakes high-shear mixer (made by E. T. Oakes Corp., Islip, New York) or other high-speed mixers such as those of the Waring type, or disc type colloid mills.

The process of the invention effects a disintegration of the fibers into fibrillar fragments resulting in a conversion of the fibrous slurry into a smooth, creamy, gel-like dispersion which has unexpected stability as manifest by maintenance of the gel-like structure for an extended period of time. For example, on standing for several days there is no appreciable synerisis or separation of the liquid from the fibrillar phase.

It is prior knowledge that cellulose and cellulosic derivative fibers can be mechanically dry ground into fine fragments. Such grinding is difficult but can be facilitated by removal of moisture which embrittles the fiber. Grinding can be still further enhanced by acid hydrolysis which removes amorphous material between crystallites and permits wet grinding. Such known products, although quite fine and sometimes approaching micron range in size of smallest particles are nevertheless granular in nature showing a predominant amount of transverse fracture and fragmentation across the long dimension of the fiber and relatively no fibrillation. It has not been prior knowledge that controlled degree substitution (D.C.) and controlled depolymerization (D.P.) accompanied by application of high-shear will permit uniform defibrillation of cellulose native structures in an aqueous slurry to yield extremely fine and stable dispersions of fibrils with a reasonable amount of energy input.

The dispersed finely fibrillated material, either in water or in ammonia, can be spray dried to yield a white and extremely fine flour or powder. This powder can be reconstituted by addition of water and with mild stirring to give stable dispersions. It can also be used in the dry state to absorb and carry many materials of aqueous and non-aqueous nature to yield stable dispersions and gels.

The above unique fibrillar dispersions are eminently suited for use in coating of paper, bonding of non-wovens and sizing of textiles. The application to the material coated can be made and followed by direct drying without need for intermediate neutralization or washing. The resultant dried coating or bond is water insoluble, and its adhesive character is extremely good because of the nature of bonding between the string-like fibrils.

The accompanying drawings are photomicrographs at ×300 in a bright field of specimens prepared from wood pulp fibers or from HEC fibers that were mechanically subdivided in water or in water containing ammonia and the slurry was spread on a plate and then dried in order to prepare good comparative results.

Figure 1:
FIG. 1 is a photomicrograph of 8% hydroxyethyl substituted wood pulp fibers prior to being subjected to subdivision in a high-shear mixer.

Briefly, HEC fibers suitable for the invention may be prepared in an operation which comprises forming alkali cellulose, for example by steeping the cellulose in 20% sodium hydroxde solution at 25° C. The alkali cellulose is reacted with gaseous ethyene oxide in such a manner as to uniformly contact the fibers and produce HEC containing from about 3 to 12% by weight based on the dry weight of the alkali cellulose of substituted ethylene oxide. The D.P. is reduced to the desired level of 50–400 D.P., then the alkali is neutralized and the salts removed by washing. The HEC of the type effectively treated according to the invention may be prepared according to the process described in the Mitchell et al. Patent 3,045,007. The HEC consists of fibers similar to those shown in FIG. 1.

The following examples illustrate processes embodying the invention:

Example I.—Ammonia-HEC Fibrillar Dispersion

Washed neutral HEC fibers (6.5–7.–pH) of 8% ethylene oxide substitution having a D.P. of 200 were mixed with 28% aqueous ammonia to form a fibrous slurry of 10% solids content. This mixture at a temperature of about 15° C. was pumped once through an Oakes high-shear mixer with power input adjusted so that the temperature of the emerging product was kept below 95° C. The emerging product was a smooth, creamy, gel-like dispersion, as compared to the fibrous, clumpy feed slurry.

Figure 3:
FIG. 3 is a photomicrograph of the fibrillar residuals of the fibers of FIG. 1 after being slurried in aqueous ammonia and subjected to subdivision in a high-shear mixer.

Microscopic examination of the dried gel-like dispersion revealed uniform finely dispersed fibrillar subdivisions of the original HEC fibers as shown in FIG. 3.

The processed dispersion was diluted with mild agitation to 1% total solids content by the addition of 28% aqueous ammonia solution and remained as a dispersion for several days without noticeable separation or settling. When dilution was with water, giving pH of 7.5, stability at 1% was good for several hours. When the water diluted dispersion of fibrils was acidified to pH 6.5 the stability at 1% was still good for at least 60 minutes.

Example II.—Water-HEC Fibrillar Dispersions

Washed neutral HEC fibers (6.5–7.0 pH) having 8% ethylene oxide substitution and a degree of polymerization of 150 were mixed with water to form a fibrous slurry of 15% solids content at about 15° C. This mixture was pumped once through an Oakes high-shear mixer with power input adjusted so that the temperature of the emerging product was kept below 95° C. The partially dispersed effluent was cooled to 15° C. and passed again through the Oakes mixer.

The emerging product was a smooth, creamy, gel-like dispersion, as compared to the fibrous clumpy feed slurry.

Figure 2:
FIG. 2 is a photomicrograph of fibrillar residuals of the fibers of FIG. 1 after being slurried in water and subjected to subdivision in a high-shear mixer.

Microscopic examination of the gel-like dispersion revealed uniform finely dispersed fibrillar subdivisions of the original HEC fibers as shown in FIG. 2.

The processed dispersion was diluted with mild agitation to 1% total solids content by the addition of water and remained as a dispersion for a period of two days without noticeable separation or settling. When the water dispersion was adjusted with acid to pH 6.5 the stability at 1% solids was in excess of 60 minutes.

Example III.—Water-HPC Dispersion

Hydroxypropyl cellulose (HPC) in fibrous form was prepared by steeping wood pulp in 18% NaOH, pressing to a press weight ratio of 2.7, reacting with propylene oxide at 40° C. to a substitution level of 10% propylene oxide by weight, aged at 40° C. to a degree of polymerization of 150, neutralized to pH 7, washed free of salts and dried.

The neutral HPC fibers were mixed with water and processed as in Example II.

The smooth, creamy, gel-like dispersions were diluted with mild agitation to 1% solids content by the addition of water and remained as a dispersion without noticeable separation or settling for an extended period.

The above unique gel-like fibrillar dispersions of the invention are suitable for use in coating of paper, bonding of non-wovens and sizing of textiles. Application can be made and followed by direct drying without need for intermediate nutralization or washing. The resultant dried coating or bond is water insoluble and has desirable dry strength properties.

We claim:

1. A high-shear string-like fibrillar product of a cellulose alkoxy ether of the group consisting of cellulose ethoxyl ether and cellulose propoxyl ether, said product having from about 3 to 12% by weight alkoxyl substitution based on the dry weight of said cellulose, having a degree of polymerization of from about 50 to 400 and being capable of forming stable dispersions of from about 3 to 25% when stirred in an aqueous medium.

2. The process for forming a gel-like dispersion of a string-like cellulose alkoxyl ether which comprises subjecting to high-shear mechanical subdivision an aqueous slurry of cellulose alkoxyl ether fibers at a consistency of from about 3 to 25% of cellulose alkoxyl ether having from about 3 to 12% by weight, based on the dry weight of the cellulose, of an alkoxyl substitution, and a degree of polymerization from about 50 to 400 at a temperature not exceeding about 95° C.

References Cited

UNITED STATES PATENTS

| 3,052,593 | 9/1962 | Battista et al. | 162—146 |
| 2,090,808 | 8/1937 | Richter | 260—231 XR |

DONALD E. CZAJA, *Primary Examiner.*

R. W. MULCAHY, *Assistant Examiner.*

U.S. Cl. X.R.

106—197; 260—232